(12) United States Patent
Li et al.

(10) Patent No.: US 11,119,265 B2
(45) Date of Patent: Sep. 14, 2021

(54) LIGHT GUIDE PLATE ASSEMBLY, BACKLIGHT MODULE, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Hailong Li, Beijing (CN); Yudong Liu, Beijing (CN); Ning Wang, Beijing (CN); Xiaozhe Zhang, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 121 days.

(21) Appl. No.: 16/500,274

(22) PCT Filed: Nov. 2, 2018

(86) PCT No.: PCT/CN2018/113804
§ 371 (c)(1),
(2) Date: Oct. 2, 2019

(87) PCT Pub. No.: WO2019/134433
PCT Pub. Date: Jul. 11, 2019

(65) Prior Publication Data
US 2020/0124780 A1 Apr. 23, 2020

(30) Foreign Application Priority Data
Jan. 2, 2018 (CN) .......................... 201810002168.4

(51) Int. Cl.
*F21V 8/00* (2006.01)

(52) U.S. Cl.
CPC ........... *G02B 6/005* (2013.01); *G02B 6/0036* (2013.01)

(58) Field of Classification Search
CPC .. G02B 6/0005; G02B 6/0088; G02B 6/0031; G02B 1/045; G02B 6/081; G02B 6/005;
(Continued)

(56) References Cited

U.S. PATENT DOCUMENTS

| 2011/0176328 A1* | 7/2011 | Anandan | ........... G02F 1/133606 362/606 |
| 2013/0241973 A1* | 9/2013 | Park | ........... G02F 1/1339 345/691 |

(Continued)

FOREIGN PATENT DOCUMENTS

| CN | 1512229 A | 7/2004 |
| CN | 101086540 A | 12/2007 |

(Continued)

OTHER PUBLICATIONS

International Search Report and Written Opinion issued in International Application No. PCT/CN2018/113804, dated Jan. 18, 2019, with English language translation.
(Continued)

*Primary Examiner* — Andrew J Coughlin
*Assistant Examiner* — Jessica M Apenteng
(74) *Attorney, Agent, or Firm* — McDermott Will and Emery LLP (57) ABSTRACT

A light guide plate assembly, includes a light conductive layer and a plurality of light exit structures. The light conductive layer is configured to cause light entering the light conductive layer to be transmitted between two opposite surfaces of the light conductive layer. The plurality of light exit structures are disposed on one of the two opposite surfaces and spaced apart. The plurality of light exit struc- (Continued)

tures are configured to enable a portion of the light to emit from the light conductive layer.

18 Claims, 8 Drawing Sheets

(58) Field of Classification Search
CPC .. G02B 6/0036; G02B 6/0055; G02B 6/0068; G02B 2027/0178; G02B 27/0172; G02F 2001/133314; G02F 2001/13332; G02F 1/13306; G09G 3/36; F21Y 2101/00
See application file for complete search history.

(56) References Cited

U.S. PATENT DOCUMENTS

| | | | |
|---|---|---|---|
| 2013/0322114 A1* | 12/2013 | Nishitani | G02B 6/0018 362/606 |
| 2014/0176863 A1* | 6/2014 | Oohira | G02B 6/0055 349/62 |
| 2016/0327717 A1 | 11/2016 | Hashiya et al. | |
| 2017/0299792 A1 | 10/2017 | Oh et al. | |
| 2018/0292713 A1* | 10/2018 | Drolet | G02F 1/133509 |
| 2019/0094450 A1* | 3/2019 | Bae | G02F 1/133615 |

FOREIGN PATENT DOCUMENTS

| | | |
|---|---|---|
| CN | 103513321 A | 1/2014 |
| CN | 104570191 A | 4/2015 |
| CN | 105940509 A | 9/2016 |
| CN | 105974666 A | 9/2016 |
| CN | 107077028 A | 8/2017 |
| CN | 107132693 A | 9/2017 |
| CN | 108196336 A | 6/2018 |
| JP | 2003-344662 A | 12/2003 |
| JP | 2016-181474 A | 10/2016 |

OTHER PUBLICATIONS

First Office Action issued in corresponding Chinese Application No. 201810002168.4, dated Mar. 27, 2019, with English language translation.

Second Office Action issued in corresponding Chinese Application No. 201810002168.4, dated Sep. 27, 2019, with English language translation.

Third Office Action issued in corresponding Chinese Application No. 201810002168.4, dated Mar. 3, 2020, with English language translation.

* cited by examiner

LIGHT GUIDE PLATE ASSEMBLY, BACKLIGHT MODULE, AND DISPLAY DEVICE

CROSS-REFERENCE TO RELATED APPLICATION

This application is a national phase entry under 35 USC 371 of International Patent Application of PCT/CN2018/113804 filed on Nov. 2, 2018, which claims priority to Chinese Patent Application No. 201810002168.4, filed with the Chinese Patent Office on Jan. 2, 2018, titled "LIGHT GUIDE PLATE, BACKLIGHT MODULE, AND DISPLAY DEVICE", which are incorporated herein by reference in their entirety.

TECHNICAL FIELD

The present disclosure relates to the field of display technologies, and in particular, to a light guide plate assembly, a backlight module and a display device.

BACKGROUND

With a development of display technologies, liquid crystal displays (referred briefly to as LCDs) have become mainstream displays in the field of display technologies due to their advantages of light and thin body, low power consumption, no radiation, long service life and so on.

Since liquid crystal molecules in the LCD do not have a function of self-luminescence, it is still required to provide a light source for the LCD through the backlight module.

SUMMARY

In one aspect, some embodiments of the present disclosure provide a light guide plate assembly. The light guide plate assembly includes a light conductive layer configured to cause light entering the light conductive layer to be transmitted between two opposite surfaces of the light conductive layer. The light guide plate assembly further includes a plurality of light exit structures disposed on one of the two opposite surfaces and spaced apart, and the plurality of light exit structures are configured to enable a portion of the light to exit from the light conductive layer.

In some embodiments of the present disclosure, the light guide plate assembly further includes a photoluminescent layer disposed on a side of the plurality of light exit structures away from the light conductive layer.

In some embodiments of the present disclosure, the light guide plate assembly further includes at least one blocking portion disposed between the light exit structures. The at least one blocking portion is configured to block the light entering the light conductive layer from exiting.

In some embodiments of the present disclosure, the plurality of light exit structures and the at least one blocking portion are transparent patterns. A refractive index of the plurality of light exit structures and a refractive index of the light conductive layer at a surface thereof that is in contact with the plurality of light exit structures and the at least one blocking portion are both greater than a refractive index of the at least one blocking portion.

In some embodiments of the present disclosure, the at least one blocking portion includes a plurality of blocking portions, and the plurality of light exit structures and the plurality of blocking portions are alternately arranged in a row direction, in a column direction or in row and column directions. Alternatively, the at least one blocking portion includes a single blocking portion, the plurality of light exit structures are arranged in an array, and the blocking portion is a blocking layer surrounding each light exit structures.

In some embodiments of the present disclosure, the light conductive layer includes a plurality of structural layers that are stacked. A refractive indexes of any structural layer located between outermost two structural layers in the plurality of structural layers is greater than refractive indexes of remaining structural layers on both sides of the any structural layer in the plurality of structural layers, and refractive indexes of the remaining structural layers on both sides of the any structural layer are gradually decreased, or refractive indexes of the plurality of structural layers are gradually increased in a direction directing to the light conductive layer from the light exit structures.

In some embodiments of the present disclosure, the photoluminescent layer includes a plurality of light-emitting patterns that are spaced apart, and the plurality of light exit structures are configured in a way that light exiting from the light exit structures is capable of being irradiated onto the plurality of light-emitting patterns.

In some embodiments of the present disclosure, an orthographic projection of each light-emitting pattern on the light conductive layer overlaps with an orthographic projection of at least one of the plurality of light exit structures. Alternatively, an orthographic projection of some of the plurality of light-emitting patterns on the light conductive layer overlaps with an orthographic projection of a single light exit structure on the light conductive layer.

In some embodiments of the present disclosure, the plurality of light-emitting patterns are spaced apart in a first direction, and the first direction is perpendicular to a thickness direction of the light conductive layer. Alternatively, the plurality of light-emitting patterns are arranged in an array.

In some embodiments of the present disclosure, the photoluminescent layer includes a plurality of light-emitting pattern units, each light-emitting pattern unit includes three light-emitting patterns of the plurality of light-emitting patterns, and the three light-emitting patterns in the light-emitting pattern unit are configured to emit red light, green light, and blue light.

In some embodiments of the present disclosure, a material of a light-emitting pattern for emitting the red light includes red quantum dots. A material of a light-emitting pattern for emitting the green light includes green quantum dots. A material of a light-emitting pattern for emitting the blue light includes blue quantum dots.

In some embodiments of the present disclosure, each light-emitting pattern unit further includes a light-emitting pattern for emitting white light.

In some embodiments of the present disclosure, a material of the light-emitting pattern for emitting the white light includes white phosphor.

In some embodiments of the present disclosure, the light guide plate assembly further includes a black matrix disposed between the photoluminescent layer and the plurality of light exit structures. The black matrix includes a plurality of through holes to form a plurality of sub-pixel regions, and each sub-pixel region is provided with a single light-emitting pattern therein.

In some embodiments of the present disclosure, the photoluminescent layer is used for emitting white light.

In some embodiments of the present disclosure, a material of the photoluminescent layer includes white phosphor.

Alternatively, the material of the photoluminescent layer includes red quantum dots, green quantum dots, and blue quantum dots.

In some embodiments of the present disclosure, the light guide plate assembly further includes a barrier layer disposed on a side of the photoluminescent layer away from the light conductive layer.

In some embodiments of the present disclosure, the light guide plate assembly further includes a protective layer disposed between the photoluminescent layer and the light plurality of light exit structures.

In another aspect, the embodiments of the present disclosure provide a backlight module. The backlight module includes the light guide plate assembly described above and excitation light source(s). The excitation light source(s) are configured to emit light toward the light guide plate assembly.

In some embodiments of the present disclosure, a material of a photoluminescent layer in the light plate assembly includes red quantum dots, green quantum dots and blue quantum dots, and wavelengths of the light emitted from the excitation light source(s) are less than wavelengths of blue light.

In some embodiments of the present disclosure, the excitation light source(s) are disposed at side(s) of the light guide plate assembly perpendicular to the two opposite surfaces of the light conductive layer.

In yet another aspect, the embodiments of the present disclosure provide a display device. The display device includes a display panel and the backlight module according to any of the above.

In some embodiments of the present disclosure, the light guide plate assembly in the backlight module includes a photoluminescent layer. The photoluminescent layer includes a plurality of light-emitting pattern units, and each light-emitting pattern unit includes three light-emitting patterns for emitting red light, green light, and blue light. Each sub-pixel region in the display panel corresponds to a light-emitting pattern.

In some embodiments of the present disclosure, the display panel and the backlight module are connected by means of adhesive bonding.

DETAILED DESCRIPTION

In order to make the object, technical solutions and the advantage clearer, the technical solutions in embodiments of the present disclosure will be described clearly and completely below with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
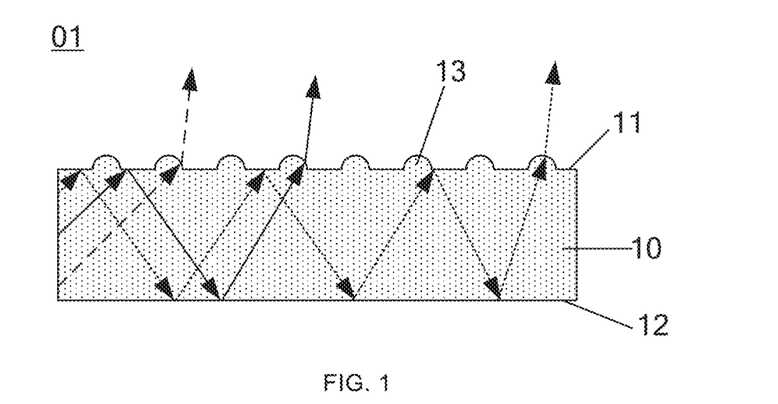
FIG. 1 is a schematic diagram showing a structure of a light guide plate assembly, in accordance with some embodiments of the present disclosure.

Embodiments of the present disclosure provide a light guide plate assembly. As shown in FIG. 1, the light guide plate assembly 01 includes a light guide plate body 10. The light guide plate body 10 has a first surface 11 and a second surface 12 opposite to each other, and is used to cause light entering the light guide plate body 10 to transmit between the first surface 11 and the second surface 12. A plurality of light exit structures 13 spaced apart are arranged on the first surface 11, so as to enable a portion of the light to exit from the light exit structures 13.

It will be noted that the term "a plurality of" refers to at least two, that is, two or more, in the embodiments of the present disclosure.

The light is transmitted between the first surface 11 and the second surface 12. That is, as shown in FIG. 1, after light emitted from a light source enters an inside of the light guide plate body 10 (the lines with arrows in FIG. 1 indicate optical paths of the light, and different lines are only used to distinguish different optical paths), when the light is irradiated onto the light exit structures 13 on the first surface 11, the light may exit from the light exit structures 13. When the light is irradiated onto other regions excluding the light exit structures 13 on the first surface 11, the light is reflected toward the second surface 12, and the light reflected toward the second surface 12 is reflected toward the first surface 11 again, and the light reflected toward the first surface 11 is reflected or refracted on the first surface 11. In the above manner, the light is transmitted from a side where the light source is located to a side opposite to the side where the light source is located, and a portion of the light exits from the light exit structures 13 during a transmission process.

Therefore, a function of the light guide plate body 10 is to restrict the light entering the inside of the light guide plate body within the light guide plate body and transmit the light within the light guide plate body, and the light may only exit from the light exit structures 13 on the first surface 11.

Specific structures of the light exit structures 13 are not limited in the embodiments of the present disclosure, as long as the light may exit from the light exit structures 13. For example, as shown in FIG. 1, protrusions as the light exit structures 13 are disposed on the first surface 11, and the light exits from the light exit structures 13 by changing an incident angle of the light at the protrusions. Of course, a structure having a suitable refractive index and disposed in a set region on the first surface 11 may serve as the light-exiting structure 13, so that the light exits from the light exit structures 13. Of course, the light exit structures 13 may also be other forms that enable the light to exit from the set regions on the first surface 11.

Thus, through the above light guide plate assembly 01 provided by the embodiments of the present disclosure, the plurality of light exit structures 13 spaced apart are disposed on the first surface 11 of the light guide plate body 10, so that the light entering the light guide plate body 10 may only exit from set regions where the light exit structures 13 are located, thereby enabling the light guide plate body 10 to achieve an effect that the light exits from regions, and enabling the light guide plate assembly 01 including the light guide plate body 10 to meet different light exiting requirements.

With regard to a backlight module in the related art, in order to enable a brightness, a uniformity and the like of light entering a display panel to meet requirements, the backlight module usually needs to be provided with optical films therein, whereas the optical films are prone to scratches, wrinkles, looseness and other problems, which will affect a display quality of a liquid crystal display (LCD) during use.

Figure 2A:
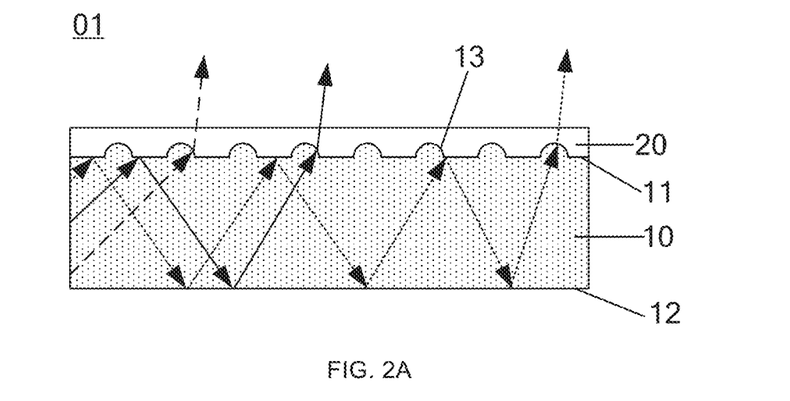
FIG. 2A is a schematic diagram showing a structure of another light guide plate assembly, in accordance with some embodiments of the present disclosure.
Figure 2B:
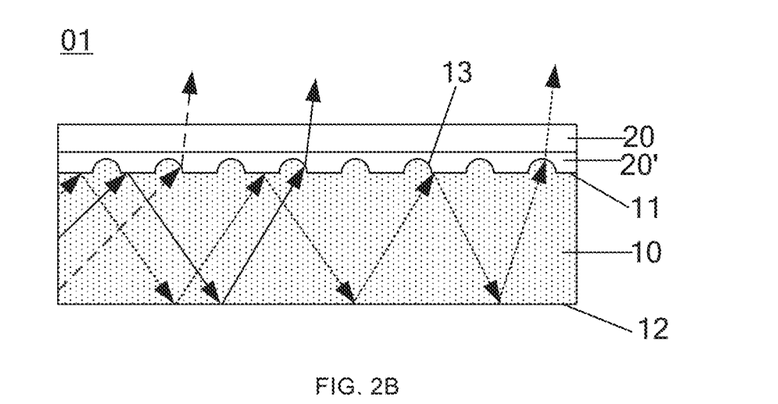
FIG. 2B is a schematic diagram showing a structure of yet another light guide plate assembly, in accordance with some embodiments of the present disclosure.

In some embodiments of the present disclosure, as shown in FIG. 2A or FIG. 2B, the above light guide plate assembly 01 further includes a photoluminescent layer 20 that is disposed on a side where the first surface 11 of the light guide plate body 10 is located and stacked on the light guide plate body 10.

Here, referring to FIG. 2A, the photoluminescent layer 20 may be directly disposed on a side of the light exit structures 13 away from the light guide plate body 10. Alternatively, as shown in FIG. 2B, depending on specific requirements for use, another film layer 20' may also be provided between the photoluminescent layer 20 and light exit structures 13.

A material of the photoluminescent layer 20 is not limited, as long as the photoluminescent layer 20 may obtain energy after being irradiated by the light exiting from the light exit structures 13 so as to be excited and emit light.

Thus, some embodiments of the present disclosure further provide a light guide plate assembly 01 including the photoluminescent layer 20 described above. When the light guide plate assembly 01 is applied to the backlight module, the photoluminescent layer 20 is excited by the light exiting from the light exit structures 13 to emit light, which may enable the brightness and uniformity of the light exiting from the backlight module to be better, and there is no need to provide the optical films. Accordingly, there is no problem that the display quality of the LCD is affected by the scratches, wrinkles, looseness and other problems of the optical films.

Figure 3:
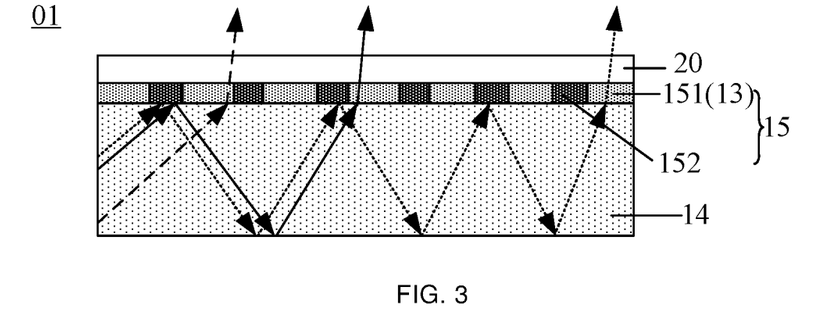
FIG. 3 is a schematic diagram showing a structure of yet another light guide plate assembly, in accordance with some embodiments of the present disclosure.

For example, as shown in FIG. 3, the light guide plate body 10 includes a light conductive layer 14. The light guide plate assembly 01 includes an optical path adjustment layer 15 covering the light conductive layer 14. The optical path adjustment layer 15 includes a plurality of light-transmissive portions 151 spaced apart, and blocking portion(s) disposed between the light-transmissive portions 151. The light-transmissive portions 151 are the light exit structures 13 described above. That is, a portion of the light entering the light guide plate body 10 may exit from the light-transmissive portions 151. The blocking portion(s) 152 are used for blocking the light entering the light guide plate body 10 from exiting. That is, the light may exit only from the light-transmissive portions 151 serving as the light exit structures 13, so as to achieve the effect that the light exits from regions.

In order to achieve the effect that the light exits from regions, the light-transmissive portions 151 and the blocking portion(s) 152 may be, for example, as follows.

The light-transmissive portions 151 are first transparent patterns, and the blocking portion(s) 152 are second transparent pattern(s). A refractive index of the first transparent patterns 151 and a refractive index of the light conductive layer 14 at a surface thereof that is in contact with the optical path adjustment layer 15 are all greater than a refractive index of the second transparent pattern(s) 152.

Here, the refractive index of the light conductive layer 14 at the surface thereof that is in contact with the optical path adjustment layer 15 refers to a refractive index of a film layer of the light conductive layer 14 in direct contact with the optical path adjustment layer 15.

The refractive index $n_0$ of the light conductive layer 14 at the surface thereof that is in contact with the optical path adjustment layer 15 is greater than the refractive index $n_1$ of the second transparent pattern(s) 152, that is, $n_0 > n_1$. Thus, a light transmission from the surface of the light conductive layer 14 that is in contact with the optical path adjustment layer 15 to the second transparent pattern(s) 152 corresponds to a light transmission from an optically denser medium to an optically thinner medium. In this case, there is a first critical angle $\theta_1$, which may be expressed by the following formula:

$$\theta_i = \arcsin\frac{n_1}{n_0}.$$

Thus, light having an incident angle greater than or equal to the first critical angle will be reflected at the second transparent pattern(s) 152. The smaller the refractive index $n_1$ of the second transparent pattern(s) 152 as the optically thinner medium are, the better an effect of a total reflection of the light at the second transparent pattern(s) 152 is.

The light exits from the first transparent patterns 151. In a case where the refractive index $n_2$ of the first transparent patterns 151 is greater than the refractive index $n_0$ of the light conductive layer 14 at the surface thereof that is in contact with the optical path adjustment layer 15, that is, $n_2 > n_0$, the light is transmitted from the optically thinner medium to the optically denser medium, and the light will be refracted at the first transparent patterns 151.

In a case where $n_2$ is less than or equal to $n_0$, in order to enable the light to exit from the first transparent patterns 151, the refractive index $n_2$ of the first transparent patterns 151 shall be greater than the refractive index $n_1$ of the second transparent pattern(s) 152, that is, $n_2 > n_1$. In this case, there is a second critical angle $\theta_2$, which is expressed by the following formula:

$$\theta_2 = \arcsin\frac{n_2}{n_0}.$$

Obviously, since $n_2$ is greater than $n_1$, the first critical angle $\theta_1$ is less than the second critical angle $\theta_2$. That is, a critical angle of the light at the first transparent patterns 151 is greater. A small portion of the light will be reflected at the first transparent patterns, and light having an incident angle less than the second critical angle $\theta_2$ will be refracted at the first transparent patterns 151. Since the first transparent pattern 151 is the optically denser medium relative to the second transparent pattern 152, the larger the refractive index $n_2$ of the first transparent pattern 151 is, the better a refractive effect is, that is, more light will exit from the first transparent pattern 151.

As a result, after the light enters the light guide plate body 10 at a certain angle, the light may be refracted at the first transparent patterns 151, and may be reflected at the second transparent pattern(s) 152. The first transparent patterns 151, i.e., as the light exit structures, enable a portion of the light to exit from the first transparent patterns 151.

Thicknesses of the first transparent patterns 151 and the second transparent pattern(s) 152 described above may be the same or different, and FIG. 3 is only schematic and is not for limitation.

The first transparent patterns 151 and the second transparent pattern(s) 152 may be formed, for example, by using hydrofluoric acid to etch respective optical materials having corresponding refractive indexes.

As a result, in some embodiments of the present disclosure, the light guide plate assembly 01 includes the light conductive layer 14 and the optical path adjustment layer 15, so that a portion of the light may exit from the first transparent patterns 151, and a portion of the light may be totally reflected at the second transparent pattern(s) 152, which ensures the transmission of the light entering the light guide plate body 10 and an exit of the light from the set regions (i.e., the first transparent patterns). A process is simple, a cost is lower, and the backlight module is ensured to have a better light-emitting effect.

Figure 4:
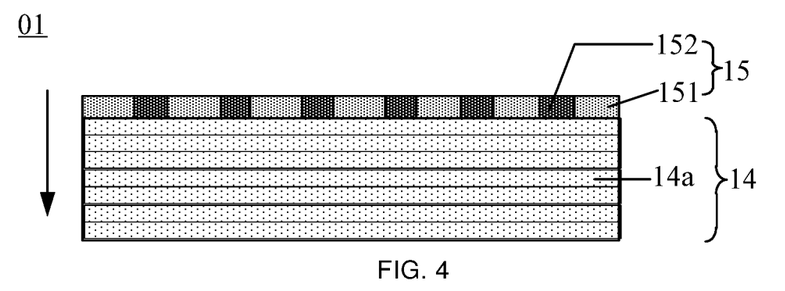
FIG. 4 is a schematic diagram showing a structure of a light conductive layer in a light guide plate assembly, in accordance with some embodiments of the present disclosure.

For example, as shown in FIG. 4, the light conductive layer 14 includes a plurality of structural layers 14a that are stacked (the seven layers illustrated in FIG. 4 are merely examples, and are not for limitation). In a direction (a direction indicated by the arrow in FIG. 4) directing to the light conductive layer 14 from the optical path adjustment layer 15, refractive indexes of the structural layers 14a are firstly increased and then decreased, or are gradually increased.

Here, in a case where the refractive indexes of the structural layers 14a are firstly increased and then decreased, that is, an intermediate structural layer 14a has a largest refractive index, and refractive indexes of remaining structural layers 14a on both sides of the intermediate structural layer are gradually decreased in a direction away from the intermediate structural layer 14a.

The refractive indexes of the structural layers 14a may be firstly increased and then decreased in a gradual manner or in a stepwise manner.

For example, the refractive index of the intermediate structural layer in the light conductive layer 14 is the largest, and the refractive indexes of the remaining structural layers 14a on both sides may be gradually decreased by a same variation rule.

In a case where the refractive indexes of the structural layers 14a are gradually increased, the refractive indexes of the structural layers 14a may be gradually increased in a gradual or stepwise manner.

Waves having different wavelengths from the light source may be reflected or refracted by using the gradual manner, thereby improving a utilization rate of the light source.

An arrangement method of the light-transmissive portions (for example, the first transparent patterns) and the blocking portion(s) (for example, the second transparent pattern(s)) may be any one of the following exemplary arrangement methods.

Figure 5A:
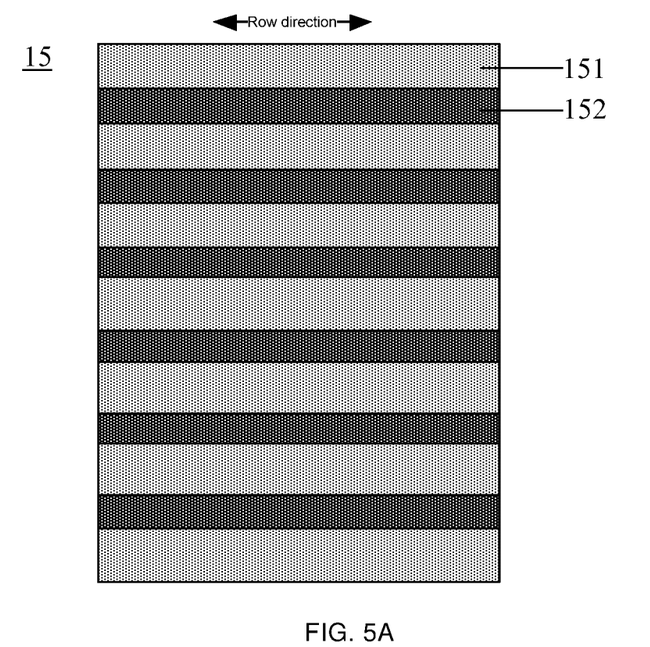
FIG. 5A is a schematic diagram showing a structure of an optical path adjustment layer in a light guide plate assembly, in accordance with some embodiments of the present disclosure.

As shown in FIG. 5A, the light-transmissive portions 151 and the blocking portions 152 are alternately arranged in a column direction.

Figure 5B:
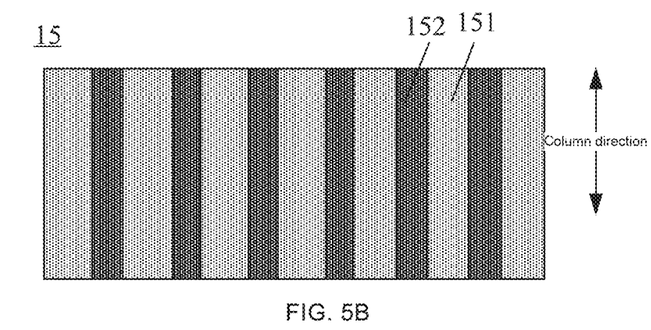
FIG. 5B is a schematic diagram showing a structure of another optical path adjustment layer in a light guide plate assembly, in accordance with some embodiments of the present disclosure.

As shown in FIG. 5B, the light-transmissive portions 151 and the blocking portions 152 are alternately arranged in a row direction.

With continued reference to FIG. 5A or FIG. 5B, shapes of the light-transmissive portions (for example, the first transparent patterns) 151 may be strip-shaped, and in this case, shapes of the blocking portions (for example, the second transparent patterns) 152 are also strip-shaped. The first transparent patterns 151 and the second transparent patterns 152 are alternately arranged in the row direction or in the column direction.

Figure 5C:
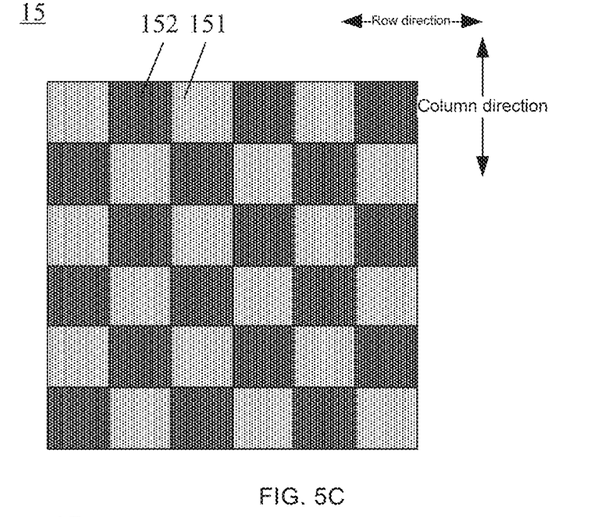
FIG. 5C is a schematic diagram showing a structure of yet another optical path adjustment layer in a light guide plate assembly, in accordance with some embodiments of the present disclosure.

As shown in FIG. 5C, the light-transmissive portions 151 and the blocking portions 152 are alternately arranged in the row direction and in the column direction.

That is, the optical path adjustment layer 15 may also include a plurality of second transparent patterns 152, and each second transparent pattern 152 is disposed between two adjacent first transparent patterns 151 in the row direction and in the column direction.

Figure 5D:
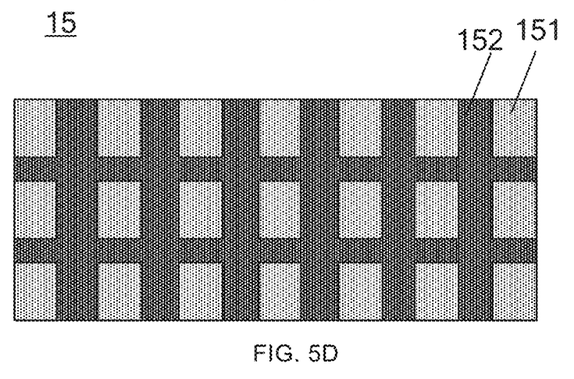
FIG. 5D is a schematic diagram showing a structure of yet another optical path adjustment layer in a light guide plate assembly, in accordance with some embodiments of the present disclosure.

As shown in FIG. 5D, the plurality of light-transmissive portions 151 are arranged in an array, and the blocking portion 152 is a whole layer surrounding each light-transmissive portion 151.

That is, the shapes of the first transparent patterns 151 may also be block-shaped, and the plurality of first transparent patterns 151 are arranged in an array. In this case, the second transparent pattern 152 is disposed around the first transparent patterns 151, and the second transparent pattern 152 in the optical path adjustment layer 15 is a transparent film layer having a plurality of hollowed-out portions, and each first transparent pattern 151 is filled in a corresponding hollowed-out portion.

In some embodiments of the present disclosure, the photoluminescent layer 20 includes a plurality of light-emitting patterns spaced apart, and the light exiting from the light exit structures 13 may be irradiated onto the light-emitting patterns.

An arrangement methods of the light-emitting patterns include but are not limited to the following two arrangement methods.

Figure 6:
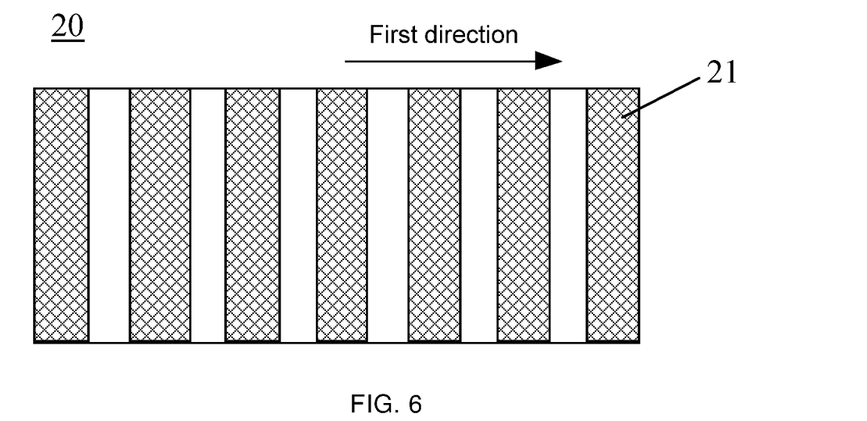
FIG. 6 is a schematic diagram showing a structure of a photoluminescent layer in a light guide plate assembly, in accordance with some embodiments of the present disclosure.

(1) As shown in FIG. 6, the photoluminescent layer 20 includes a plurality of light-emitting patterns 21 spaced apart in a first direction, and the first direction is perpendicular to a thickness direction of the light guide plate body 10.

Figure 7:
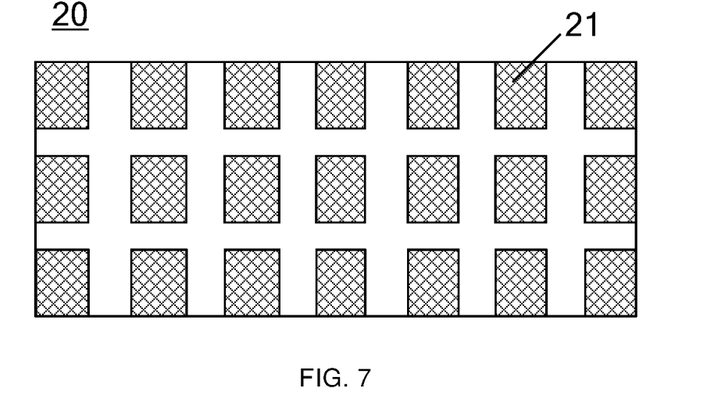
FIG. 7 is a schematic diagram showing a structure of another photoluminescent layer in a light guide plate assembly, in accordance with some embodiments of the present disclosure.

(2) As shown in FIG. 7, the photoluminescent layer 20 includes a plurality of light-emitting patterns arranged in an array.

The light exiting from the light exit structures 13 may be irradiated onto the light-emitting patterns 21, and in a direction directing to the photoluminescent layer from the light-guide plate body, each light-emitting pattern may correspond to at least one light exit structure. That is, each light-emitting pattern corresponds to a single light exit structure. In this case, the light exiting from a single light exit structure 13 is irradiated only onto a single light-emitting pattern 21. Alternatively, each light-emitting pattern corresponds to multiple light exit structures, and the light exiting from the multiple light exit structures 13 is irradiated onto a same light-emitting pattern 21.

Of course, in the direction directing to the photoluminescent layer from the light guide plate body, multiple light-emitting patterns may also correspond to a single light exiting structure, that is, the light exiting from a single light exit structure 13 is irradiated onto the multiple light-emitting patterns 21.

Whichever arrangement method is selected, as long as each light-emitting pattern 21 may be irradiated by the light exiting from the light exit structures 13.

A method of manufacturing the above photoluminescent layer 20 may be the same as a method of manufacturing a color film layer in a color film substrate in the related art. For example, the photoluminescent layer 20 is manufactured by using a coating method or an inkjet printing method.

For example, the photoluminescent layer 20 described above is used for emitting white light. That is, the photoluminescent layer 20 emits the white light after being excited by the light exiting from the light exit structures 13.

The material of the photoluminescent layer 20 may include white phosphor. Alternatively, the material of the photoluminescent layer 20 may include red quantum dots, green quantum dots, and blue quantum dots. That is, the material of the photoluminescent layer 20 is a mixture of quantum dots of different colors. The red quantum dots, the green quantum dots, and the blue quantum dots emit red light, green light, and blue light respectively after being excited, and the three kinds of light of three primary colors may form the white light after being mixed.

Thus, by causing the photoluminescent layer 20 to emit the white light, the backlight module including the light guide plate assembly may be applied to the display panel in the related art without changing a structure of the display panel.

Figure 8:
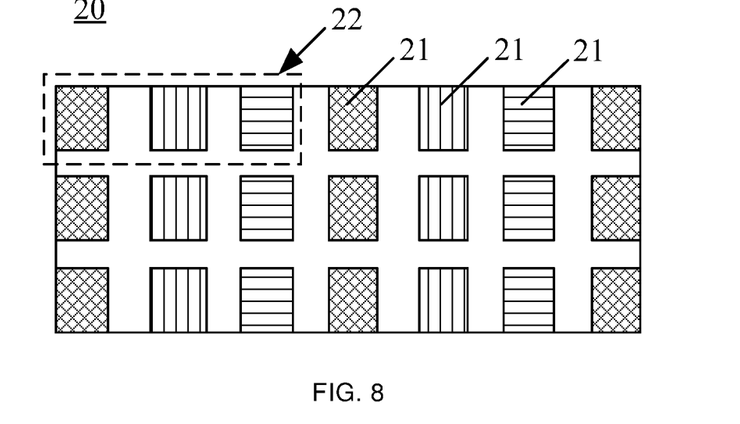
FIG. 8 is a schematic diagram showing a structure of yet another photoluminescent layer in a light guide plate assembly, in accordance with some embodiments of the present disclosure.

Alternatively, as shown in FIG. 8, the photoluminescent layer 20 includes a plurality of light-emitting pattern units 22. Each light-emitting pattern unit 22 includes a light-emitting pattern 21 for emitting the red light, a light-emitting pattern 21 for emitting the green light, and a light-emitting pattern 21 for emitting the blue light.

That is, the photoluminescent layer 20 includes a plurality of light-emitting pattern units 22 arranged in a regular way. After being excited by the light exiting from the light exit structures 13, each light-emitting pattern unit 22 includes a light-emitting pattern 21 that emits the red light, a light-emitting pattern 21 that emits the green light and a light-emitting pattern 21 that emits the blue light.

By patterning the photoluminescent layer 20, different light-emitting patterns 21 may emit light of different colors, so as to achieve that the photoluminescent layer 20 emits colored light. Thus, there is no need to provide a color film layer in a display panel that is combined with the backlight module including the above light guide plate assembly 01, which reduces a thickness of the display panel, and contributes to an overall thinning of the display device.

Materials of the three light-emitting patterns 21 for emitting the red, green, and blue light in the light-emitting pattern unit 22 include the red quantum dots, the green quantum dots, and the blue quantum dots, respectively.

For example, each light-emitting pattern unit 22 may further include a light-emitting pattern for emitting the white light, a material of which includes the white phosphor.

Figure 9:
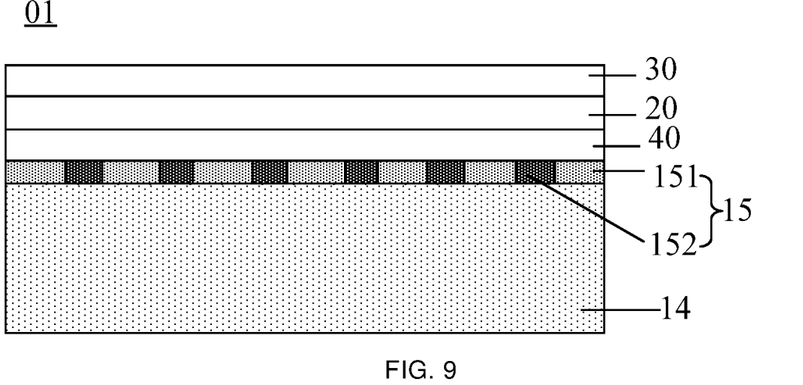
FIG. 9 is a schematic diagram showing a structure of yet another light guide plate assembly, in accordance with some embodiments of the present disclosure.

For example, as shown in FIG. 9, the light guide plate assembly 01 described above further includes a barrier layer 30 (for example, a water-oxygen barrier layer that blocks water and oxygen) disposed on a side of the photoluminescent layer 20 away from the light guide plate body 10.

In order to avoid affecting a light exit efficiency of the photoluminescent layer 20, a refractive index of the water-oxygen barrier layer 30 is the same everywhere, and the water-oxygen barrier layer is a homogeneous film layer.

Thus, by providing the water-oxygen barrier layer 30 over the photoluminescent layer 20, water vapor and oxygen may be prevented from affecting the photoluminescent layer 20, and planarization may also be achieved.

With continued reference to FIG. 9, the light guide plate assembly 01 described above further includes a protective layer 40 disposed between the photoluminescent layer 20 and optical path adjustment layer 15.

In order to avoid an influence on the light exiting from optical path adjustment layer 15 and directed to the photoluminescent layer 20, a refractive index of the protective layer 40 is the same everywhere, and the protective layer is a homogeneous film layer.

Thus, by providing the protective layer 40 between the photoluminescent layer 20 and optical path adjustment layer 15, on one hand, the planarization may be achieved, so that the photoluminescent layer 20 is disposed on a relatively flat film layer, and on the other hand, it is possible to avoid damage to other film layers that have already been formed during a manufacture of the photoluminescent layer 20.

Figure 10:
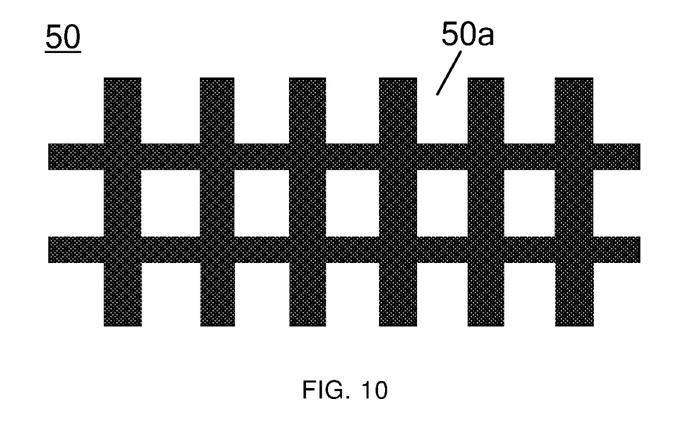
FIG. 10 is a schematic diagram showing structures of a black matrix in a light guide plate assembly, in accordance with some embodiments of the present disclosure.

As shown in FIG. 10, the light guide plate assembly 01 further includes a black matrix 50 disposed between the photoluminescent layer and optical path adjustment layer 15, and the black matrix 50 includes a plurality of through holes arranged in an array to form a plurality of sub-pixel regions 50a. Each sub-pixel region is provided with a light-emitting pattern described above therein.

Figure 11:
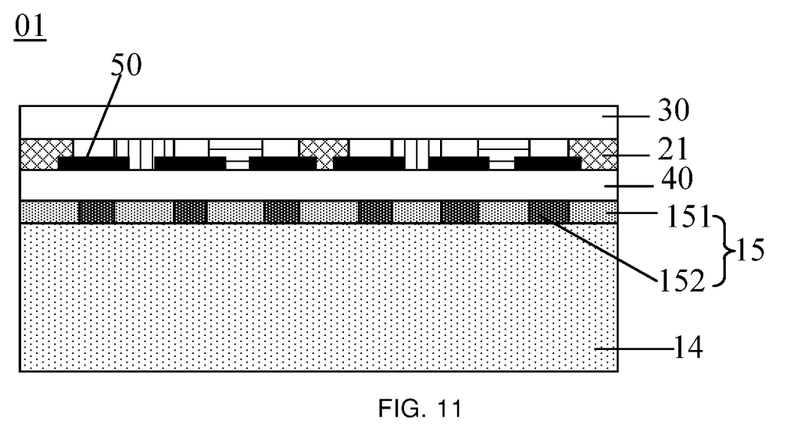
FIG. 11 is a schematic diagram showing a structure of yet another light guide plate assembly, in accordance with some embodiments of the present disclosure.

For example, as shown in FIG. 11, two sides of the black matrix 50 in the thickness direction of the light guide plate body 10 may be in contact with the light-emitting patterns 21 in the photoluminescent layer and the protective layer 40, respectively.

Figure 12:
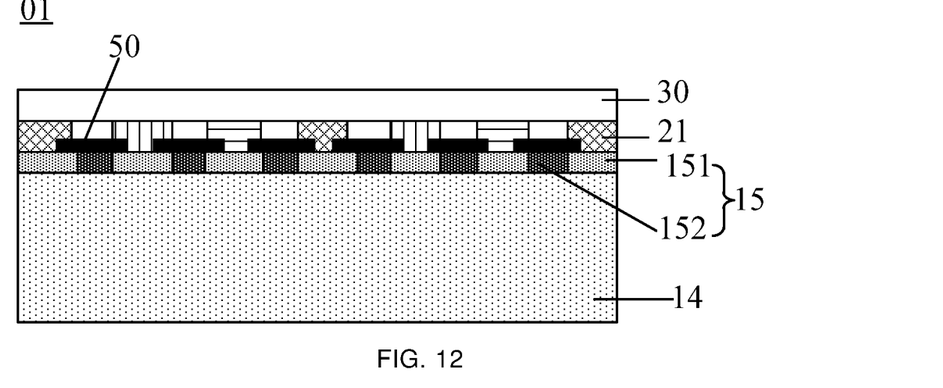
FIG. 12 is a schematic diagram showing a structure of yet another light guide plate assembly, in accordance with some embodiments of the present disclosure.

For another example, as shown in FIG. 12, the two sides of the black matrix 50 in the thickness deriction of the light guide plate body 10 may be in contact with the light-emitting patterns 21 in the photoluminescent layer and optical path adjustment layer 15, respectively.

Figure 13:
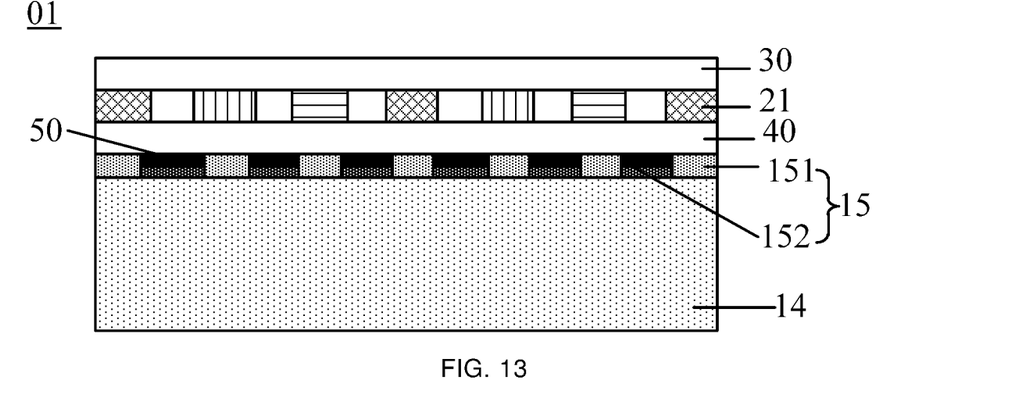
FIG. 13 is a schematic diagram showing a structure of yet another light guide plate assembly, in accordance with some embodiments of the present disclosure.

For yet another example, as shown in FIG. 13, the two sides of the black matrix 50 in the thickness direction of the light guide plate body 10 may be in contact with the protective layer 40 and optical path adjustment layer 15, respectively.

Figure 14:
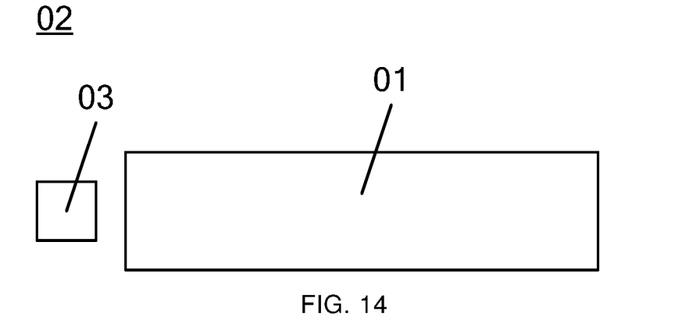
FIG. 14 is a schematic diagram showing a structure of a backlight module, in accordance with some embodiments of the present disclosure.

Embodiments of the present disclosure further provide a backlight module. As shown in FIG. 14, the backlight module 02 includes the light guide plate assembly 01 provided by the above embodiments and excitation light source(s) 03. Light emitted from the excitation light source(s) is used for entering the light guide plate body in the light panel assembly 01.

For example, the excitation light source(s) 03 may be disposed on a side of the light guide plate body perpendicular to the first surface of the light guide plate body as shown in FIG. 14.

The side(s) may be at least one of a plurality of sides defined by the first surface and the second surface of the light guide plate body. For example, the excitation light source(s) 03 may be disposed at one of the sides or at two opposite sides of the sides.

Of course, the excitation light source(s) may also be disposed beneath the light guide plate body, that is, at the second surface, and the light is guided to at least one of the plurality of sides via an optical path transmission structure such as an optical fiber.

The backlight module provided by some embodiments of the present disclosure includes the above light guide plate assembly, and beneficial effects achieved by the backlight module are the same as those of the light guide plate assembly provided by the above embodiments of the present disclosure, which are not described herein again.

For example, the material of the photoluminescent layer in the light guide plate assembly includes the red quantum dots, the green quantum dots, and the blue quantum dots. Wavelengths of the light emitted from the excitation light source(s) are less than wavelengths of the blue light.

The wavelengths of the light emitted from the excitation source(s) are made less than the wavelengths of the blue light. Since the smaller the wavelength, the higher the energy, the energy that the light emitted from the excitation source(s) has is high, and the red quantum dots, the green quantum dots and the blue quantum dots may all be excited.

Figure 15:
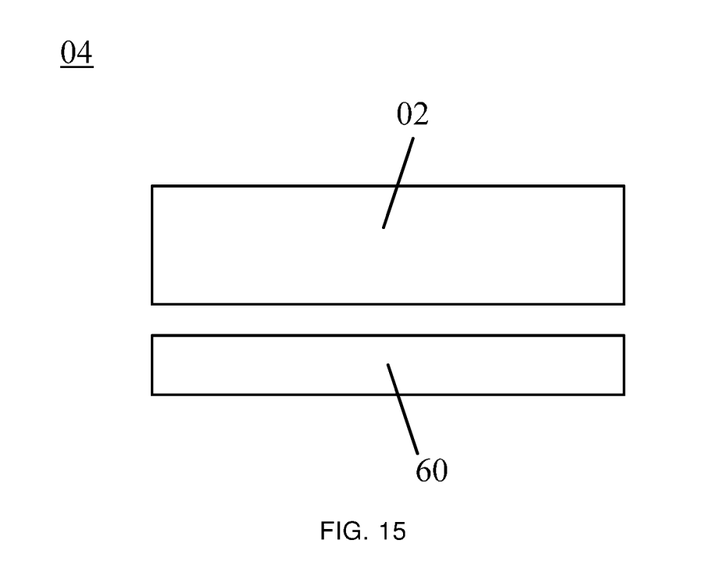
FIG. 15 is a schematic diagram showing a structure of a display device, in accordance with some embodiments of the present disclosure.

Some embodiments of the present disclosure further provide a display device. As shown in FIG. 15, the display device 04 includes a display panel 60 and the backlight module 02 described above.

The display device provided by some embodiments of the present disclosure includes the above light guide plate assembly 01, and beneficial effects achieved by the display device are the same as those of the above light guide plate assembly, which are not described herein again.

For example, the display panel 60 and the backlight module 02 are connected by means of adhesive bonding.

Figure 16:
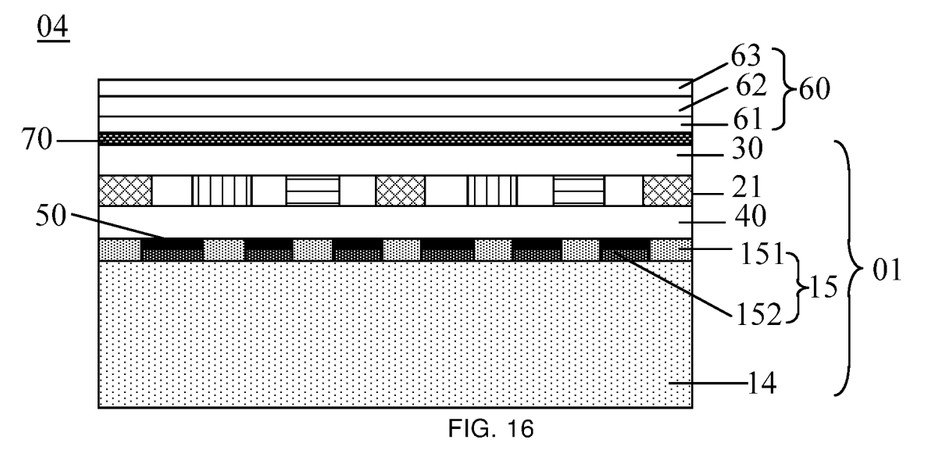
FIG. 16 is a schematic diagram showing a structure of another display device, in accordance with some embodiments of the present disclosure.

As shown in FIG. 16, the display panel 60 includes an array substrate 61, a liquid crystal layer 62, and an opposite substrate 63. That is, the display panel 60 and the backlight module 02 are connected through a transparent adhesive layer 70. The transparent adhesive layer 70 may be an optically clear adhesive (referred briefly to as OCA) or a white sealant (i.e., a white adhesive coated only around a display area), etc.

In the above display panel 60, in a case where the backlight module 01 emits the white light, the opposite substrate 63 opposite to the array substrate 61 may be a color film substrate (i.e., having a color filter film). If the array substrate 61 is a color filter on array (referred briefly to as COA) substrate, that is, the color filter film is formed in the array substrate, the opposite substrate 63 opposite to the array substrate 61 may also be a cover glass.

Alternatively, in a case where the backlight module 02 emits light of three primary colors, a corresponding structure of the color film may be omitted from the display panel 60. Therefore, the opposite substrate 63 opposite to the array substrate 61 may be the cover glass, and there is no need to provide the color filter film.

Figure 17:
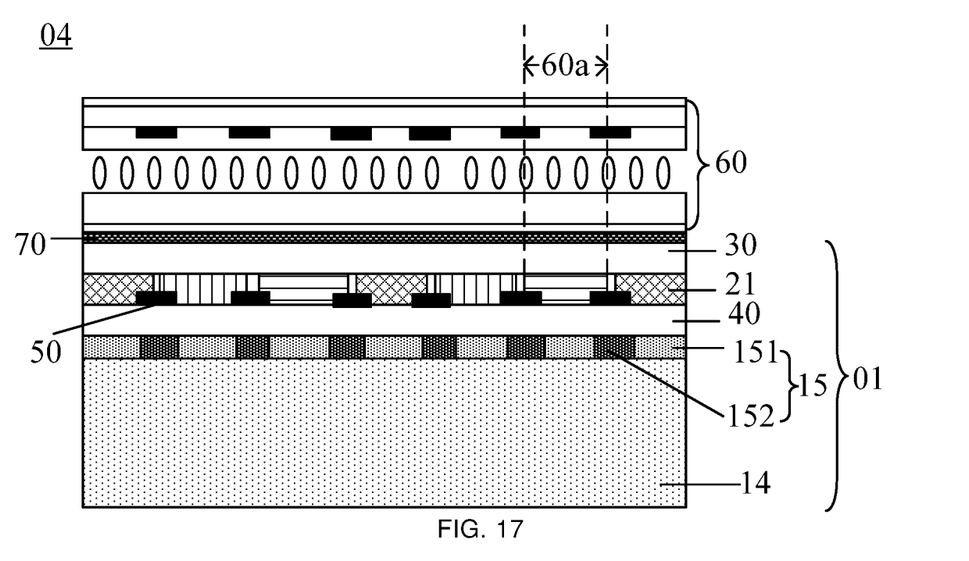
FIG. 17 is a schematic diagram showing a structure of yet another display device, in accordance with some embodiments of the present disclosure.

For example, as shown in FIG. 17, a light-emitting pattern unit of the backlight module 01 includes three light-emitting patterns 21 respectively emitting the red, green, and blue light, and each sub-pixel region 60a in the display panel corresponds to a corresponding light-emitting pattern 21.

It will be understood that in a case where the light-emitting pattern unit of the backlight module 01 includes three light-emitting patterns 21 respectively emitting the red, green, and blue light, that is, the light emitted from the backlight module 01 is the light of the three primary colors, the above display panel 60 may not be provided with the color film layer therein.

The sub-pixel regions divided by the black matrix 50 over the light guide plate body correspond to the sub-pixel regions 60a in the display panel 60.

Thus, it is not necessary to provide the color film layer in the display panel 60, and the thickness of the display panel may be reduced, thereby further reducing a thickness of the display device.

The display device provided by the embodiments of the present disclosure may be any device that displays an image whether moving (for example, a video) or fixed (for example, a still image), and whether literal or graphical. More explicitly, it is contemplated that the described embodiments may be implemented in or associated with a variety of electronic devices. The variety of the electronic devices may include (but are not limit to), for example, mobile telephones, wireless devices, portable android devices (PAD), hand-held or portable computers, global positioning system (GPS) receivers/navigators, cameras, MPEG-4 Part 14 (MP4) video players, a vidicon, game consoles, watches, clocks, calculators, TV monitors, flat panel displays, computer monitors, car displays (such as odometer displays), navigators, cockpit controllers and/or displays, camera view displays (such as a display of a rear view camera in a vehicle), electronic photos, electronic billboards or signages, projectors, building structures, packaging and aesthetic structures (such as a display for an image of a piece of jewelry).

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A light guide plate assembly, comprising:
a light conductive layer configured to cause light entering the light conductive layer to be transmitted between two opposite surfaces of the light conductive layer;
a plurality of light exit structures disposed on one of the two opposite surfaces and spaced apart; and
at least one blocking portion disposed between the plurality of light exit structures; wherein
the plurality of light exit structures are configured to enable a portion of the light to emit from the light conductive layer;
the at least one blocking portion is configured to block the light entering the light conductive layer from exiting;
the plurality of light exit structures and the at least one blocking portion are transparent patterns, and a refractive index of the plurality of light exit structures and a refractive index of the light conductive layer at a surface thereof that is in contact with the plurality of light exit structures and the at least one blocking portion are both greater than a refractive index of the at least one blocking portion.

2. The light guide plate assembly according to claim 1, further comprising a photoluminescent layer, wherein the photoluminescent layer is disposed on a side of the plurality of light exit structures away from the light conductive layer.

3. The light guide plate assembly according to claim 2, wherein the photoluminescent layer includes a plurality of light-emitting patterns that are spaced apart, and the plurality of light exit structures are configured in a way that light exiting from the plurality of light exit structures is capable of being irradiated onto the plurality of light-emitting patterns.

4. The light guide plate assembly according to claim 3, wherein an orthographic projection of each light-emitting pattern on the light conductive layer overlaps with an orthographic projection of at least one of the plurality of light exit structures, or
an orthographic projection of some of the plurality of light-emitting patterns on the light conductive layer overlaps with an orthographic projection of a single light exit structure on the light conductive layer.

5. The light guide plate assembly according to claim 3, wherein the plurality of light-emitting patterns are spaced apart in a first direction, and the first direction is perpendicular to a thickness direction of the light conductive layer; or
the plurality of light-emitting patterns are arranged in an array.

6. The light guide plate assembly according to claim 3, wherein the photoluminescent layer includes a plurality of light-emitting pattern units, and each light-emitting pattern unit includes three light-emitting patterns of the plurality of light-emitting patterns, and the three light-emitting patterns in the light-emitting pattern unit are configured to emit red light, green light, and blue light.

7. The light guide plate assembly according to claim 6, wherein
a material of a light-emitting pattern for emitting the red light includes red quantum dots;
a material of a light-emitting pattern for emitting the green light includes green quantum dots; and
a material of a light-emitting pattern for emitting the blue light includes blue quantum dots.

8. The light guide plate assembly according to claim 6, wherein the light guide plate assembly further comprises a black matrix disposed between the photoluminescent layer and the plurality of light exit structures, wherein the black matrix includes a plurality of through holes to form a plurality of sub-pixel regions, and each sub-pixel region is provided with a single light-emitting pattern therein.

9. The light guide plate assembly according to claim 2, wherein the light guide plate assembly further comprises a barrier layer disposed on a side of the photoluminescent layer away from the light conductive layer.

10. The light guide plate assembly according to claim 2, wherein the light guide plate assembly further comprises a protective layer disposed between the photoluminescent layer and the plurality of light exit structures.

11. The light guide plate assembly according to claim 1, wherein the at least one blocking portion includes a plurality of blocking portions, and the plurality of light exit structures and the plurality of blocking portions are alternately arranged in a row direction, in a column direction, or in row and column directions; or
the at least one blocking portion includes a single blocking portion, the plurality of light exit structures are arranged in an array, and the blocking portion is a blocking layer surrounding each light exit structures.

12. The light guide plate assembly according to claim 1, wherein the light conductive layer includes a plurality of structural layers that are stacked; and
a refractive index of any structural layer located between outermost two structural layers in the plurality of structural layers is greater than refractive indexes of remaining structural layers on both sides of the any structural layer in the plurality of structural layers, and refractive indexes of the remaining structural layers on both sides of the any structural layer are gradually decreased in directions away from the any structural layer respectively, or
refractive indexes of the plurality of structural layers are gradually increased in a direction directing to the light conductive layer from the plurality of light exit structures.

13. A backlight module, comprising:
the light guide plate assembly according to claim 1; and
excitation light source(s) configured to emit light toward the light guide plate assembly.

14. The backlight module according to claim 13, wherein a material of a photoluminescent layer in the light guide plate assembly includes red quantum dots, green quantum dots and blue quantum dots, and wavelengths of the light emitted from the excitation light source(s) are less than wavelengths of blue light.

15. The backlight module according to claim 13, wherein the excitation light source(s) are disposed at side(s) of the light guide plate assembly, perpendicular to the two opposite surfaces of the light conductive layer.

16. A display device, comprising:
a display panel; and
the backlight module according to claim 13.

17. The display device according to claim 16, wherein the light guide plate assembly in the backlight module includes a photoluminescent layer; and the photoluminescent layer includes a plurality of light-emitting pattern units, and each light-emitting pattern unit includes three light-emitting patterns for emitting red light; green light, and blue light; and
each sub-pixel region in the display panel corresponds to a light-emitting pattern.

18. The display device according to claim 16, wherein the display panel and the backlight module are connected by means of adhesive bonding.

* * * * *